US012544020B2

(12) United States Patent
Vignoli (10) Patent No.: US 12,544,020 B2
(45) Date of Patent: Feb. 10, 2026

(54) MEDICAL ANALYSIS APPARATUS

(71) Applicant: IMS GIOTTO S.P.A., Sasso Marconi (IT)

(72) Inventor: Paolo Vignoli, San Giovanni in Persiceto (IT)

(73) Assignee: IMS GIOTTO S.P.A., Sasso Marconi (IT)

(*) Notice: Subject to any disclaimer, the term of this patent is extended or adjusted under 35 U.S.C. 154(b) by 462 days.

(21) Appl. No.: 17/979,169

(22) Filed: Nov. 2, 2022

(65) Prior Publication Data

US 2023/0143589 A1  May 11, 2023

(30) Foreign Application Priority Data

Nov. 8, 2021  (IT) ......................... 102021000028373

(51) Int. Cl.
*A61B 6/04* (2006.01)
*A61B 6/00* (2024.01)
(Continued)

(52) U.S. Cl.
CPC .......... *A61B 6/0487* (2020.08); *A61B 6/0435* (2013.01); *A61B 6/0492* (2013.01);
(Continued)

(58) Field of Classification Search
CPC ... A61B 6/0487; A61B 6/0435; A61B 6/0492; A61B 6/4405; A61B 6/4411;
(Continued)

(56) References Cited

U.S. PATENT DOCUMENTS 3,578,971 A * 5/1971 Lasky .................... A61B 6/502
 430/320
4,206,763 A * 6/1980 Pedersen .............. G01N 29/265
 73/633

(Continued)

FOREIGN PATENT DOCUMENTS

DE  10026792 A1  12/2001
EP   2656789 A1  10/2013

OTHER PUBLICATIONS

Italian Search Report dated Jun. 3, 2022 from counterpart Italian Patent Application No. 102021000028373.

*Primary Examiner* — David P Porta
*Assistant Examiner* — Gisselle M Gutierrez
(74) *Attorney, Agent, or Firm* — SHUTTLEWORTH & INGERSOLL, PLC; Timothy J. Klima (57) ABSTRACT

A medical apparatus includes a control unit including at least a first control module; a support device for a patient; a machine for allowing a diagnosis having an X-ray source, an X-ray detector, a supporting frame, supporting the source and detector, and a base frame supporting the supporting frame. The first control module is electrically coupled to the detector to receive a signal relating to the X-rays detected and processes the signal to derive an image. The support device includes a portion that can be inclined between non-operating and operating positions. The supporting frame can be inclined, with respect to the base frame, by rotation about an axis of inclination, between first and second operating positions to allow a diagnostic examination in the first or second operating positions. A coupling device between the support device and the base frame provides a removable coupling therebetween.

24 Claims, 11 Drawing Sheets

(51) Int. Cl.
*A61B 6/50* (2024.01)
*A61B 6/58* (2024.01)

(52) U.S. Cl.
CPC ......... *A61B 6/4405* (2013.01); *A61B 6/4411* (2013.01); *A61B 6/4452* (2013.01); *A61B 6/4494* (2013.01); *A61B 6/502* (2013.01); *A61B 6/527* (2013.01); *A61B 6/547* (2013.01); *A61B 6/582* (2013.01)

(58) Field of Classification Search
CPC ..... A61B 6/4452; A61B 6/4494; A61B 6/502; A61B 6/527; A61B 6/547; A61B 6/582; A61B 6/4441; A61B 6/032; A61B 6/035; A61B 6/0407; A61B 6/0478; A61B 6/102; A61B 6/4085; A61B 6/44; A61B 6/54
See application file for complete search history.

(56) References Cited

U.S. PATENT DOCUMENTS

| | | | | |
|---|---|---|---|---|
| 4,433,690 A * | 2/1984 | Green | ................ | A61B 8/4461 128/915 |
| 5,289,520 A * | 2/1994 | Pellegrino | ............ | A61B 6/0435 378/98.2 |
| 5,386,447 A * | 1/1995 | Siczek | ................ | A61B 6/0435 378/37 |
| 5,820,552 A * | 10/1998 | Crosby | ................ | A61B 90/17 600/407 |
| 7,492,858 B2 * | 2/2009 | Partain | ................ | A61B 6/4441 5/601 |
| 8,374,312 B2 * | 2/2013 | Mansfield | ............ | A61B 6/0435 378/65 |
| 8,406,846 B2 * | 3/2013 | Yoshizawa | ........... | A61B 5/4312 600/407 |
| 9,025,723 B2 * | 5/2015 | Gotman | ................ | A61B 6/54 378/207 |
| 2006/0262898 A1 * | 11/2006 | Partain | ................ | A61B 6/502 378/37 |
| 2008/0043905 A1 * | 2/2008 | Hassanpourgol | .... | A61B 6/0435 606/130 |
| 2010/0080345 A1 * | 4/2010 | Schilling | ................ | G06T 7/74 378/208 |
| 2010/0086103 A1 | 4/2010 | Jan et al. | | |
| 2010/0098214 A1 * | 4/2010 | Star-Lack | ........... | A61B 6/0435 378/65 |
| 2011/0026685 A1 * | 2/2011 | Zilberstein | ........... | A61B 6/4266 378/197 |
| 2011/0182402 A1 * | 7/2011 | Partain | ................ | A61B 6/4441 378/197 |
| 2011/0200178 A1 * | 8/2011 | Mansfield | ................ | A61N 5/10 378/209 |
| 2013/0259193 A1 * | 10/2013 | Packard | ................ | A61B 6/502 378/37 |
| 2013/0308749 A1 * | 11/2013 | Zilberstein | ............... | A61B 6/42 378/205 |
| 2019/0130563 A1 | 5/2019 | Vecchio et al. | | |

* cited by examiner

MEDICAL ANALYSIS APPARATUS

This application claims priority to Italian Patent Application IT102021000028373 filed Nov. 8, 2021, the entirety of which is incorporated by reference herein.

This invention relates to a medical apparatus for X-ray analyses.

There are known medical X-ray apparatuses which comprise a source configured to emit X-rays and a detector configured to receive the X-rays emitted by the source.

Such apparatuses can be machines to perform, for example, mammography, tomosynthesis, breast CT, biopsies, CESM.

In order to perform the above-mentioned medical tests, the patient's breast is interposed between the X-ray source and the detector.

In this way, the breast may be passed through by the X-ray radiation which has been emitted by the source, so that the image of the breast is generated on the detector.

Some apparatuses are designed to allow examinations with the patient in a vertical position in such a way that the procedure is easy for the patient, for breasts of any size.

Prior art systems, which are generally apparatuses dedicated specifically to a particular examination, have a supporting table for the patient so as to perform an examination in a prone position.

The prone position allows the operators to work in a more comfortable manner around the patient and to reduce the occurrence of vasovagal reactions, that is, fainting, in particular for performing the biopsy.

However, the vertical position may be uncomfortable to maintain, or even impracticable, for elderly or disabled patients.

Moreover, an examination with the patient in a vertical position may be less comfortable for the operators.

At the same time, however, for these patients, the prone position may also be difficult, or even impossible, to be achieved due to any limitations to the motor functions.

A need felt in the trade is to speed up and facilitate the positioning of the patient for examinations performed using X-ray medical apparatuses.

An aim of the invention is to provide an apparatus for X-ray examinations which overcomes the above-mentioned drawbacks and satisfy the above-mentioned need.

More specifically, an aim of the invention is to provide an apparatus for X-ray medical examinations which improves the speed, ease and comfort of the procedures for positioning the patient for these examinations.

Another aim of the apparatus for X-ray examinations described in the invention is to ensure ease of operation of the apparatus for the operators who operate it.

A further aim of the invention is to provide an apparatus for X-ray examinations which guarantees a high level of safety during these examinations both to the patient and to the operators in charge.

The features of the invention are clearly described in the claims below and its advantages are more apparent from the detailed description which follows, with reference to the accompanying drawings which illustrate a preferred, non-limiting example embodiment of the invention and in which:

It should be noted that all the drawings are schematic and are therefore not representative of the actual dimensions of the system.

With reference to the accompanying drawings, the numeral 1 denotes a medical apparatus for X-ray analysis.

According to the invention, the apparatus 1 comprises at least one support device 10 for a patient, a control unit U and a machine 40 to allow a diagnosis using X-rays.

According to this invention, the control unit U comprises a first control module U1.

Preferably, the first control module U1 is associated with the machine 40.

According to the invention, the machine 40 comprises at least one X-ray source 41 and at least one X-ray detector 42.

The support device 10 for a patient comprises a portion 11 which can be inclined between a non-operating position P1 and an operating position P2.

According to and aspect of the invention, the support device 10 comprises a base portion 19.

According to an aspect of the invention, the apparatus 1 comprises a first actuator 21.

The control unit U is configured to control the first actuator 21.

In the accompanying drawings the control unit U has not, for simplicity, been connected to the various actuators.

Preferably, the first actuator 21 is an electromechanical actuator.

The actuator 21 is designed to move the inclinable portion 11, with respect to the base portion 19, in rotation with respect to an axis A2 transversal to the main direction of extension D1 of the inclinable portion 11.

Preferably, the transversal axis A2 is horizontal.

In other words, the actuator 21 may be, for example, a piston or a telescopic jack which, by applying a force on the inclinable portion 11, allows the rotation of the inclinable portion 11 about a pivot located below it, in use, at the axis of rotation A2.

This rotation allows the inclinable portion 11 to be inclined between the non-operating position P1 and the operating position P2.

It should be noted that the inclinable portion 11 may be positioned in any intermediate position between the non-operating position P1 and the operating position P2.

According to an aspect, the non-operating position P1 corresponds to the position of the inclinable portion 11 in which the patient is positioned on the inclinable portion 11.

Figure 6:
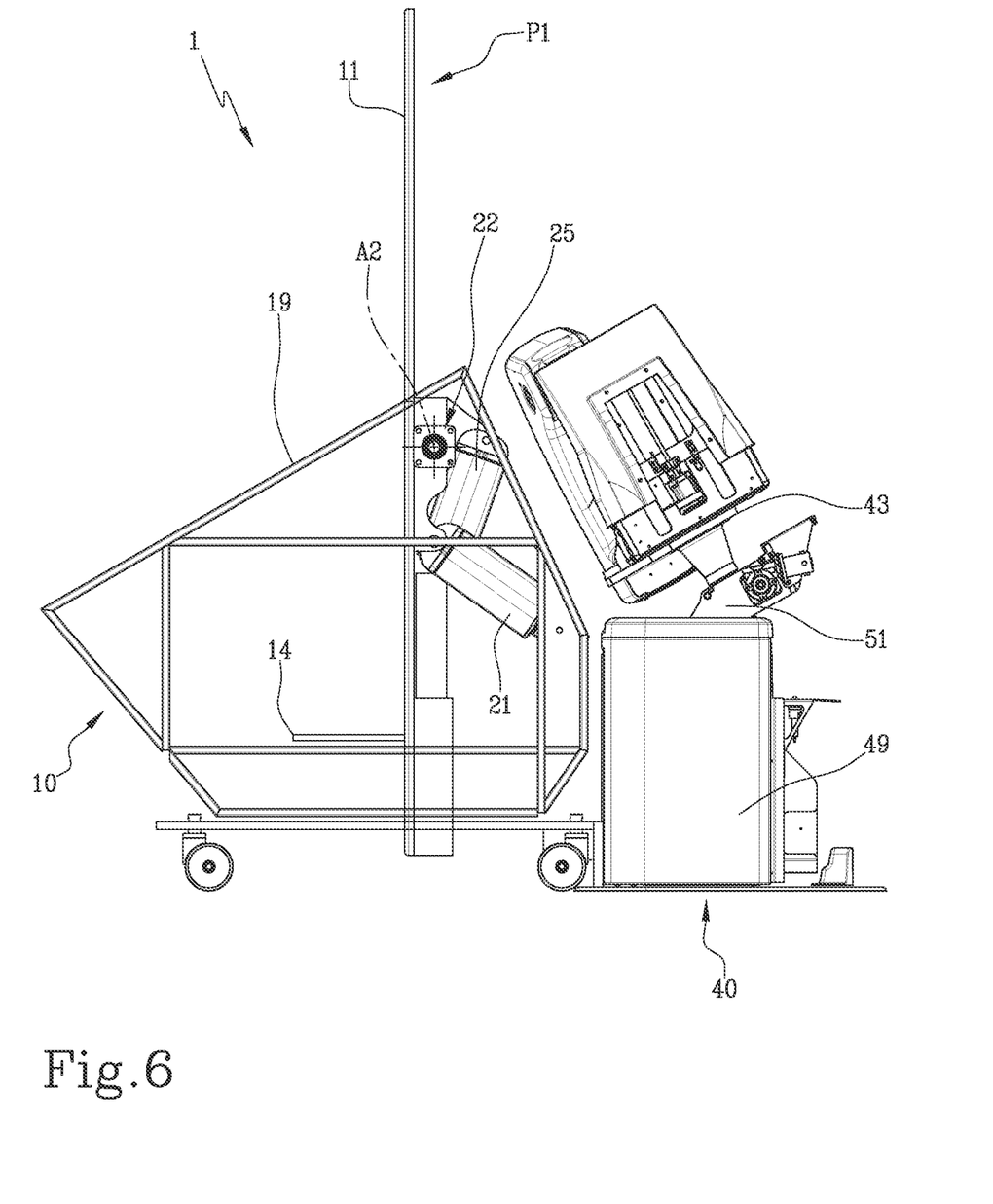
Figure 7:
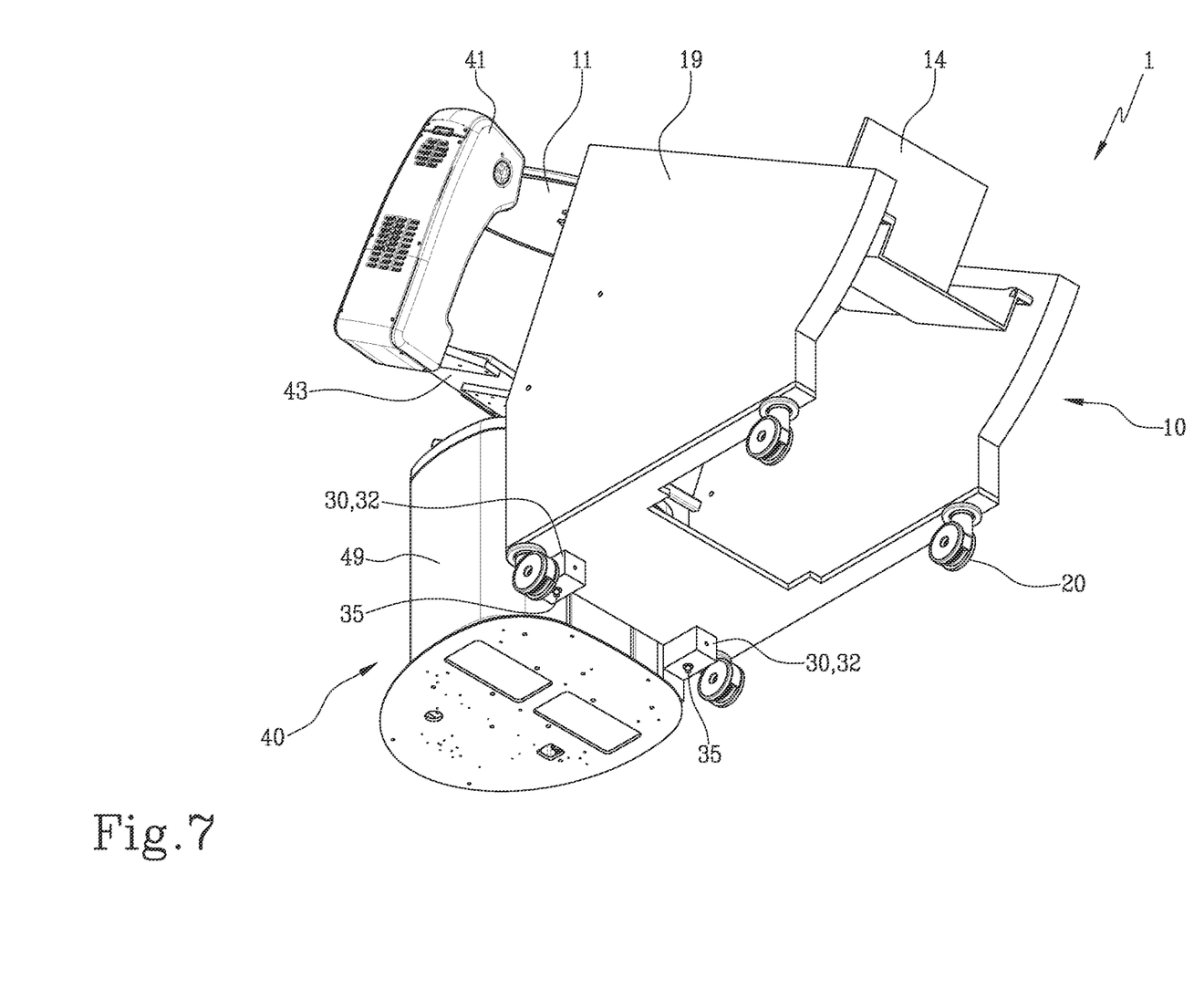
FIGS. 7 and 8 are schematic perspective views of the apparatus of FIG. 1 in two different configurations.
Figure 8:
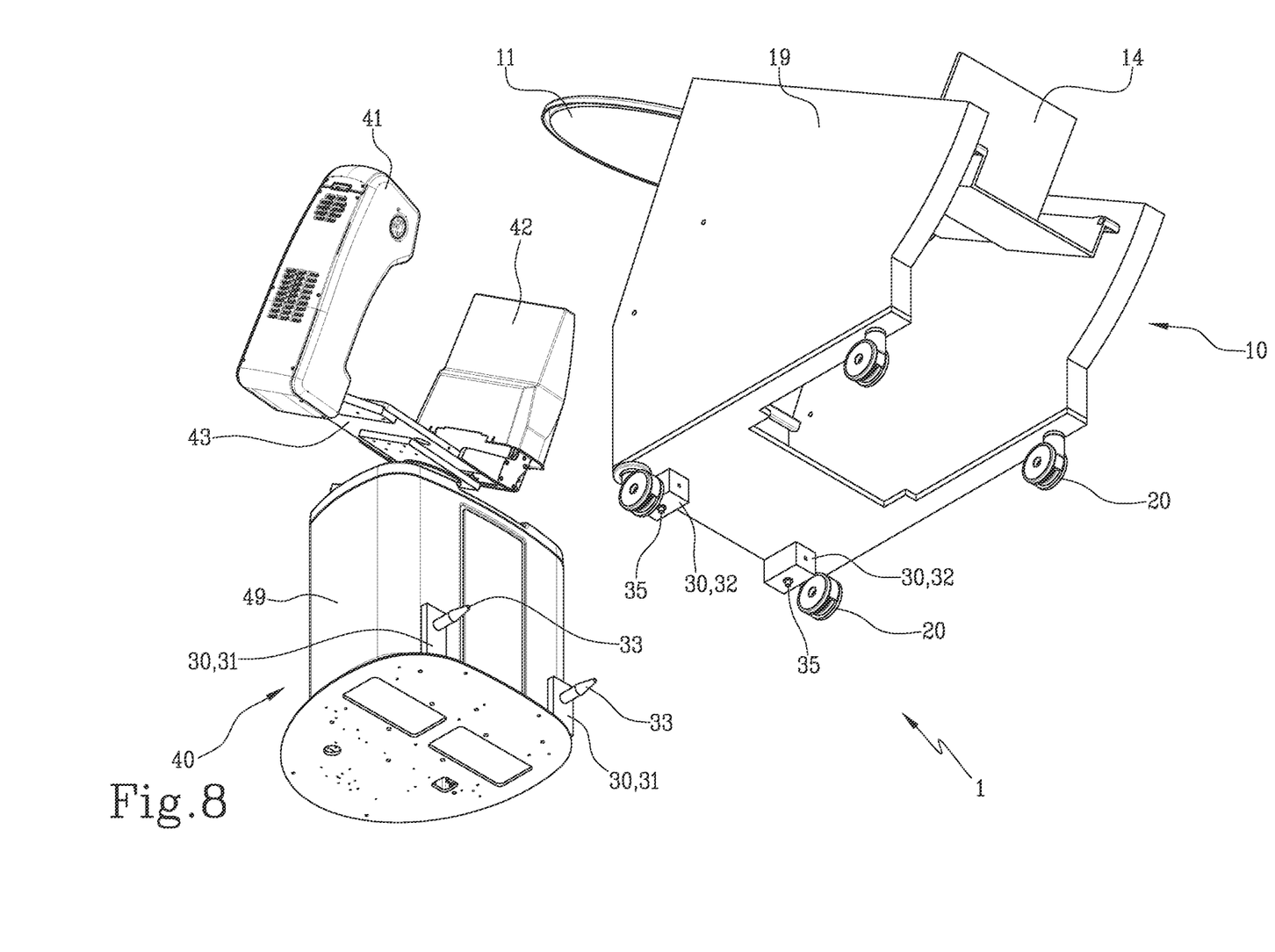
Figure 9:
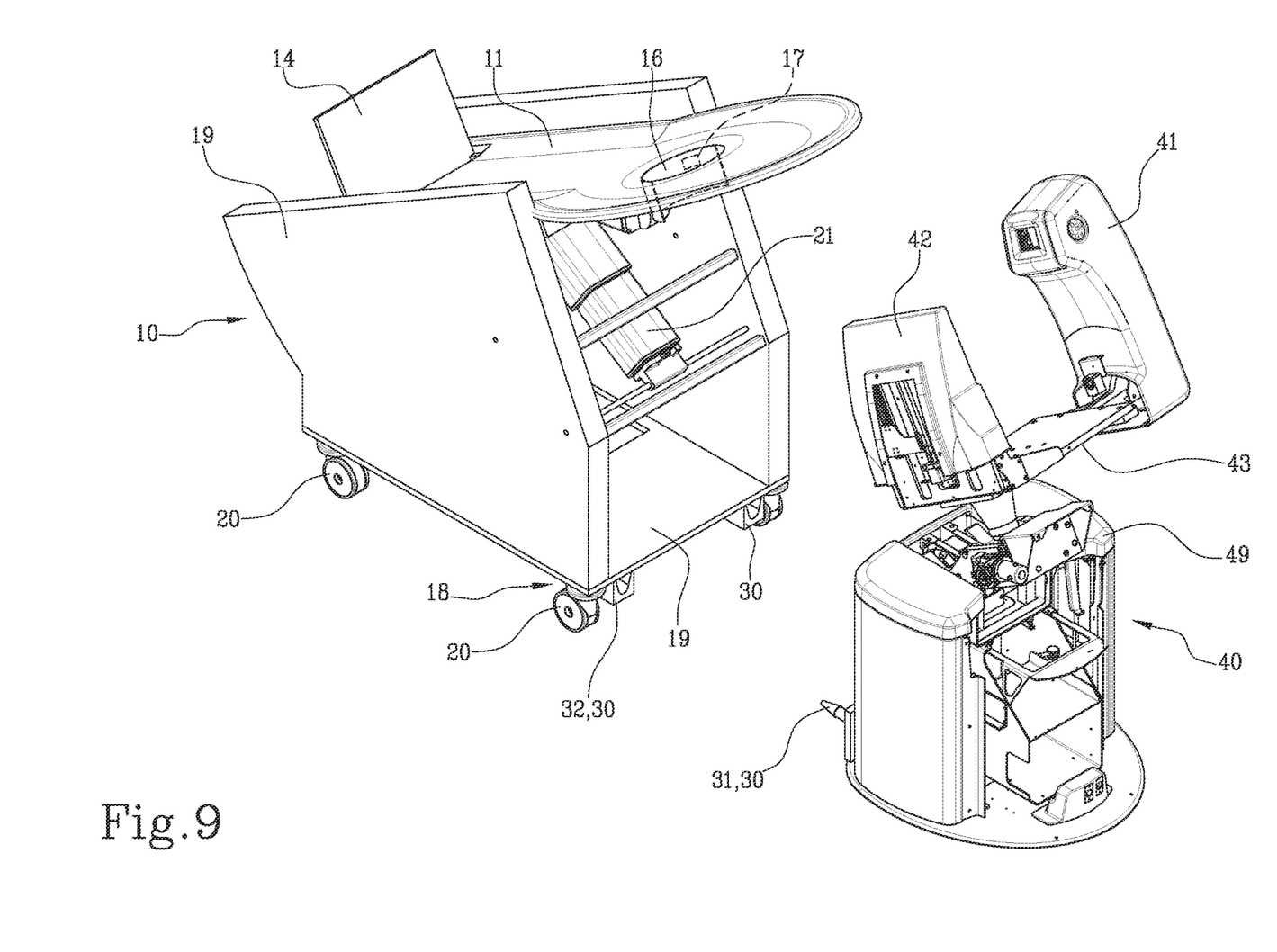
FIG. 9 is a schematic perspective view of the apparatus of FIG. 1.

According to a preferred embodiment, as illustrated in FIG. 6, the non-operating position P1 corresponds to a vertical position of the inclinable portion 11, that is to say, a position in which the patient can rest on the inclinable portion 11 in a standing position.

Figure 5:
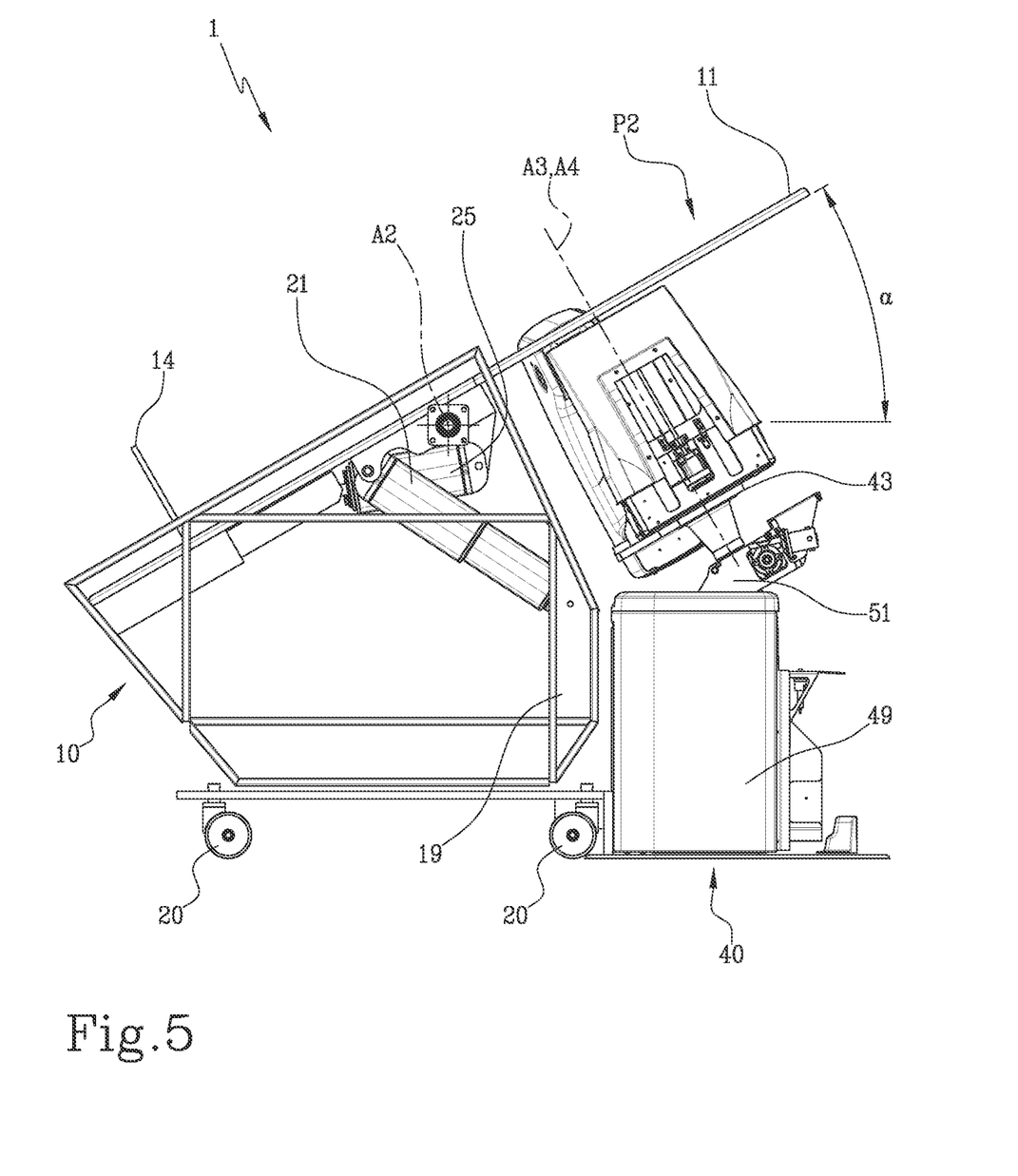
FIGS. 5 and 6 are schematic side views of the apparatus of FIG. 1 in two different positions without some parts, in order to better illustrate others.

According to a preferred embodiment, as illustrated in FIG. 5, the operating position P2 corresponds to a position of the inclinable portion 11 inclined at a predetermined angle α relative to the horizontal of between 0° and 90°.

According to an aspect of the invention, the support device 10 comprises means 22 for locking the inclinable portion 11, configured to allow a locking of the inclinable portion 11 in a predetermined position between the non-operating position P1 and the operating position P2.

The locking means 22, for example, may be mechanical and/or electrical.

The control unit U is configured to control the locking means 22.

In other words, the inclinable portion 11 can move from a vertical position to a horizontal position and vice versa, locking at any angle α of between 0° and 90°.

Preferably, the operating position P2 corresponds to a position of the inclinable portion 11 inclined at an angle α of between 20° and 40° relative to the horizontal; still more preferably, the angle α is 30° relative to the horizontal.

Advantageously, the movement of the inclinable portion 11 from a vertical position to a horizontal position, and vice versa, allows the patient to be positioned easily and comfortably whilst the portion 11 is vertical and, subsequently, by adjusting the inclination of the portion 11, an optimum positioning can be obtained for the examination.

The mobility of the inclinable portion 11 thus favours and speeds up the positioning of the patient, supporting relative limited motor functions, without adversely affecting the correct positioning with respect to the machine 40 for the analysis to be performed.

Advantageously, the possibility for the inclinable portion 11 to lock at any angle makes it possible to reach the optimum position for any type of examination.

According to an aspect, the inclinable portion 11 of the support device 10 comprises a supporting surface 12 for the patient.

According to an aspect, the supporting surface 12 has an opening 13.

The opening 13 is designed to receive at least one breast of the patient.

By way of example, the inclinable portion 11 may be an inclinable couch on which the patient can rest with the abdomen facing towards the couch, in such a way that at least one relative breast inserts into the opening 13.

The opening 13, with reference to the position P1 of the inclinable portion 11, is situated in an upper portion of the inclinable portion 11.

The opening 13 is preferably curvilinear in shape; still more preferably circular, elliptical or oval in shape.

According to an aspect of the invention, the inclinable portion 11 of the support device 10 comprises an lifting plane 14.

In other words, the inclinable portion 11 comprises an lifting plane 14 which is coupled (preferably movably) to the supporting surface 12.

According to a preferred embodiment, the lifting plane 14 is perpendicular to the supporting surface 12.

According to a preferred embodiment, the lifting plane 14 is a footboard.

The lifting plane 14, with reference to the position P1 of the inclinable portion 11, is situated in a lower portion of the inclinable portion 11.

According to a particular embodiment, the lifting plane 14 does not have a mechanical connection with the inclinable portion 11.

The lifting plane 14 can be movable along a main direction of extension D1 of the inclinable portion 11.

According to an aspect, the apparatus 1 comprises a fifth actuator 25.

The control unit U is configured to control the fifth actuator 25.

Preferably, the fifth actuator 25 is an electromechanical actuator.

The fifth actuator 25 is configured for moving the lifting plane 14 along the main direction of extension D1 of the inclinable portion 11.

In other words, it is possible to move the lifting plane 14 on the supporting surface 12 along the direction D1.

Considering the embodiment wherein the lifting plane 14 is perpendicular to the supporting surface 12, the perpendicularity between the lifting plane 14 and the supporting surface 12 remains during and after the movement of the lifting plane 14.

The control unit U is configured to control the fifth actuator 25.

Advantageously, the presence of the lifting plane 14 facilitates the patient in positioning relative to the apparatus 1.

Advantageously, the movable lifting plane 14 allows the patient to be positioned on the inclinable portion 11 of the support device 10 in an optimum manner regardless of the anthropometric measurements of the patient.

In other words, the lifting plane 14 is raised and lowered allowing the patient to always be positioned on the inclinable portion 11 in such a way that at least one breast is at the opening 13.

Figure 3:
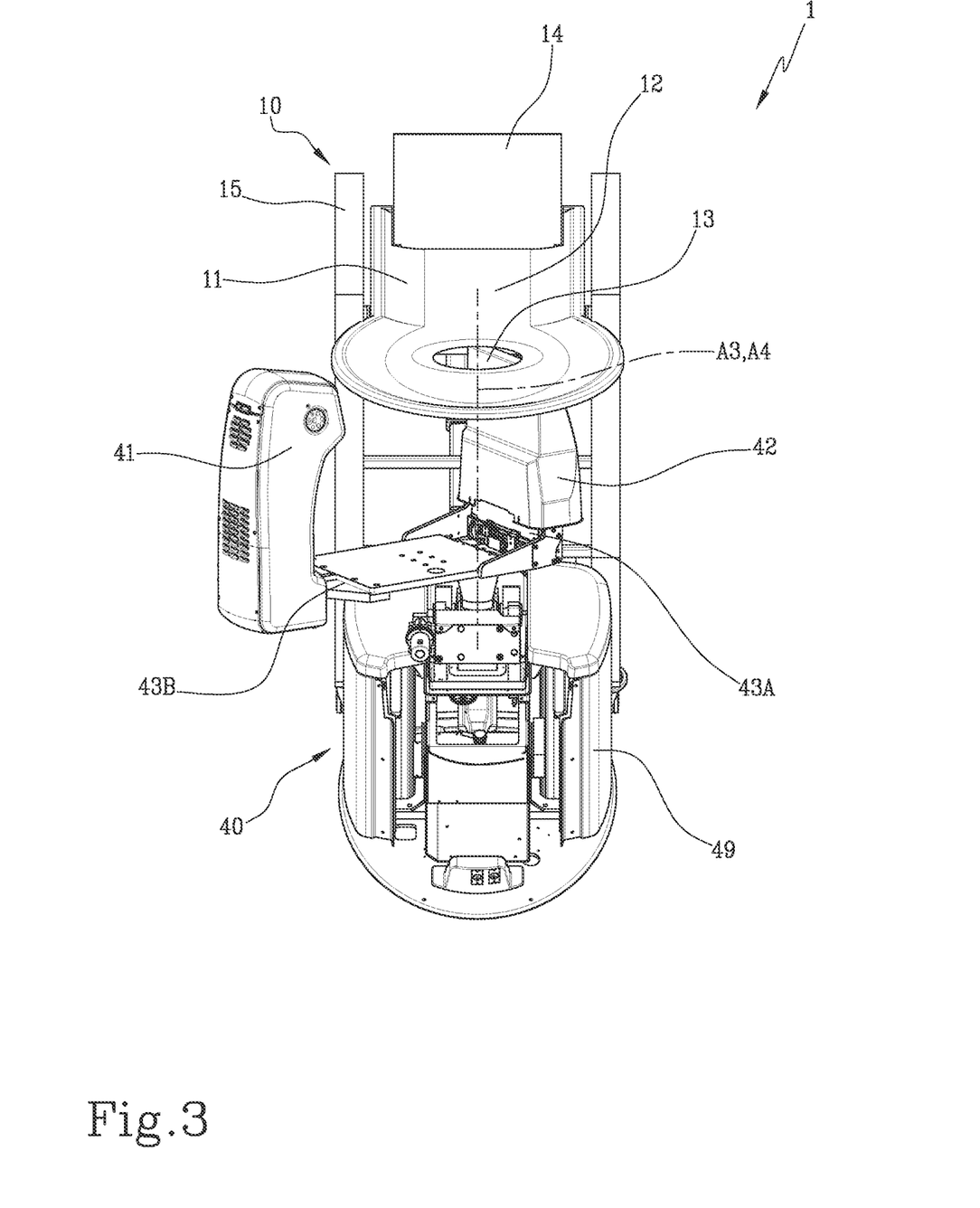
Figure 4:
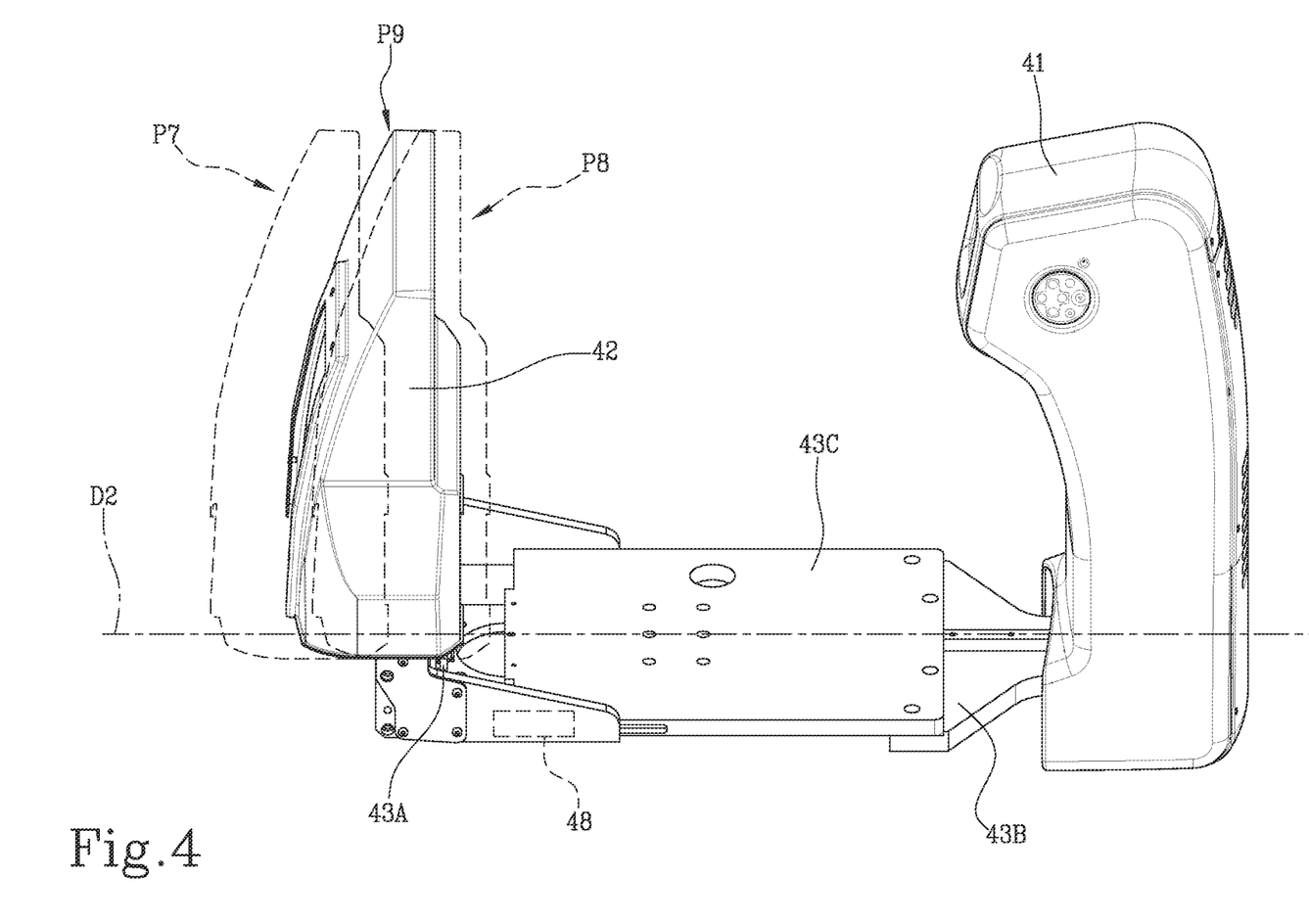
FIG. 4 is a schematic perspective view of a detail of the apparatus of FIG. 1.

According to an aspect of the invention, the support device 10 comprises at least one lateral support 15 (illustrated schematically in FIG. 3).

Advantageously, the presence of at least one lateral support 15 facilitates the approach to the lifting plane 14 by the patient.

In other words, the patient can rest on the lateral support 15 to climb with the feet on the lifting plane 14.

Advantageously, the at least one lateral support 15 makes it possible to avoid any falls of the patient, especially in the case of fainting, at the sides of the inclinable portion 11, especially when the latter is in the operating position P2 or during the movement from the non-operating position P1 to the operating position P2 (and vice versa) of the inclinable portion 11.

According to an aspect of the invention, the support device 10 comprises further aids and supports, not illustrated in the accompanying drawings, designed to widen the supporting surface 12 for the patient and to improve the comfort of the patient.

Preferably, the further aids and supports can be removably coupled to the inclinable portion 11.

According to an aspect of the invention, the support device 10 comprises a breast protection support 16.

According to an aspect, the breast protection support 16 may be made of metallic or plastic material.

The breast protection support 16 is located below, in use, the inclinable portion 11 at the opening 13.

The breast protection support 16 is removable with respect to the inclinable portion 11.

In particular, the breast protection support 16 can be attached to or removed from the inclinable portion 11 without moving the patient already positioned.

According to an aspect, the breast protection support 16 has sheet-like shape and is curved to adapt to the shape of the opening 13 and of the breast of the patient.

The breast protection support 16 may be coupled to the inclinable portion 11 at different possible inclinations relative to the inclinable portion 11.

Advantageously, the breast protection support 16 makes it possible to prevent any impact between the breast and the machine 40 during an operational analysis step.

It should be noted that the protection support 16 is removable relative to the inclinable portion 11 since it is not necessary in all the examinations and could even become a disturbing element.

According to a preferred embodiment, the breast protection support 16 has graphical marking elements.

The graphical marking elements are, for example, graphical aids, which can also be luminous, which provide visual references in such a way as to guarantee the correct positioning of the breast.

Advantageously, the graphical marking elements make it possible to compensate for alignment errors between the support device 10 and the machine 40.

According to an aspect of the invention, the apparatus 1 comprises a radiofrequency identification element 17.

According to a preferred embodiment, the radiofrequency identification element 17 is associated with the breast protection support 16.

The radiofrequency identification element 17 is operatively connected to the control unit U.

The control unit is configured for reading the RFID signal coming from the radiofrequency identification element 17 and adjusting the collimation process of the X-rays as a function of it.

Advantageously, the radiofrequency identification element 17 makes it possible to compensate for the shape of the protection support 16 during reconstruction of the image.

The base portion 19 of the support device 10 comprises a plurality of wheels 20.

According to an aspect of the invention, the support device 10 comprises parking brakes 18.

The parking brakes 18 are configured so that, once activated, they prevent any movements of the support device 10.

According to an aspect of the invention, the apparatus 1 comprises a manual lever designed to actuate the parking brakes 18.

According to an embodiment, the parking brakes 18 are configured to be actuated automatically when the patient climbs onto the lifting plane 14.

In other words, the lifting plane 14 may comprise sensors designed to detect the presence of a patient on it.

The control unit U is connected to these sensors and is configured to operate or not the parking brakes 18 as a function of the signal detected by the sensors.

Advantageously, the parking brakes 18 guarantee that the support device 10 is not moved whilst the patient is already positioned on the inclinable portion 11.

Advantageously, the parking brakes 18 guarantee that the support device 10 does not move in an unexpected manner during the X-ray examinations.

According to an aspect of the invention, the apparatus 1 comprises movement sensors 24 of the support device 10 and/or of the patient.

The movement sensors 24 are, for example, in a non-limiting manner, video cameras and/or lasers and/or radar.

According to a preferred embodiment, the movement sensors 24 are accelerometers.

The movement sensors 24 are connected to the control unit U and are configured to send a signal to the control unit U.

The control unit U is configured to derive images as a function of the signal.

In other words, if there is an unexpected movement of the support device 10 or, as is more likely, of the patient, the movement sensors 24 are able to detect it and transmit information to the control unit U in such a way that it derives the image taking into account this movement.

Advantageously, thanks to the connection between the movement sensors 24 and the control unit U it is possible to increase the level of precision of the images derived from the X-ray analysis, even in the presence of unpredictable movements caused by external forces or in any case not controllable in advance.

According to an aspect of the invention, the control unit U comprises a second control module U2.

Preferably, the second control module U2 is associated with the support device 10.

The second control module U2 is electrically coupled to the lifting plane 14 and/or to the first actuator 21.

The second control module U2 is configured to control the movement of the lifting plane 14 and/or the first actuator 21.

According to an embodiment, the second control module U2 is configured to receive the signal sent by the movement sensors 24.

According to the invention, the machine 40 comprises a source 41 configured to emit X-rays, an X-ray detector 42 and a supporting frame 43.

The supporting frame 43 supports at least the source 41 and the detector 42.

According to an aspect, the machine 40 comprises a base frame 49.

According to an aspect, the machine 40 comprises an arm 51.

The supporting frame 43 is connected (indirectly) to the base frame 49 by the arm 51.

The arm 51 is rotatably connected (hinged) to the base frame 49.

The arm 51 supports the supporting frame 43.

According to the invention, the apparatus 1 comprises coupling means 30 between the support device 10 for a patient and the base frame 49.

The coupling means 30 are configured to allow a removable coupling between the support device 10 for a patient and the base frame 49.

Advantageously, a removable coupling between the support device 10 and the base frame 49 allows, for example, the positioning of the patient on the support device 10 to be disengaged from the presence of the machine 40 and/or to perform maintenance individually on the support device 10 or machine 40 or to replace one or the other if necessary.

It should be noted that the machine 40, once the support device 10 has been detached from it, can be adapted easily and extremely quickly also for other examinations, in particular its configuration may be modified, by moving, for example, the supporting frame 43 between a first operating position P3 and a second operating position P4 to allow a diagnostic examination to be performed in the second operating position P4. This aspect is described in more detail below, where the advantages connected to the mobility of the supporting frame 43 may be inferred in a clearer manner.

Advantageously, a removable coupling between the support device 10 and the base frame 49 makes it possible to make the maintenance and transport operations of the machine 40 and/or of the support device 10 more comfortable since they can be performed individually.

Advantageously, the removable coupling between the support device 10 and the base frame 49, together with the possible inclination of the supporting frame 43 between a first and a second operating position (P3, P4) and of the inclinable portion 11 at various angles, makes it possible to quickly pass from a configuration of the apparatus 1 for mammography/tomography with the patient standing to one in which to perform, for example, a Cone Beam Breast Computed Tomography (CBBCT) with the patient in the prone position.

The coupling means 30 may be, for example, mechanical or magnetic.

According to an embodiment, the coupling means 30 comprise first means 31 and second means 32 removably acting in conjunction with the first means 31.

The first means 31 are associated with one of either the support device 10 or the base frame 49 and the second means 32 are associated with the other between the base frame 49 or the support device 10.

According to an aspect, the first means 31 comprise a protuberance 33.

According to an aspect, the second means 32 comprise a recess 34.

The protuberance 33 and the recess 34 are configured to be coupled by a shape coupling.

Figure 10A:
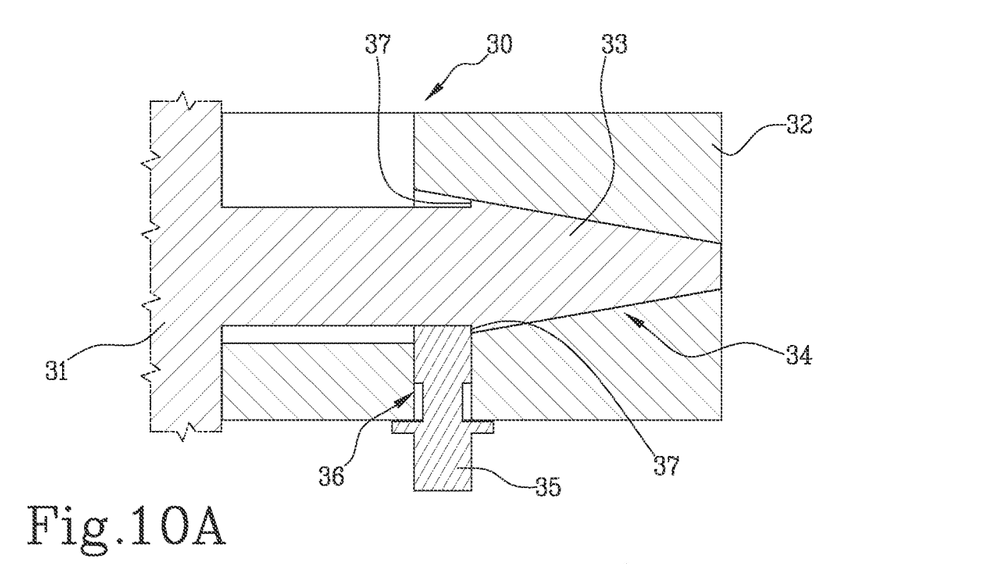
FIGS. 10A and 10B schematically illustrate cross sections of a detail of the apparatus of FIG. 1.
Figure 10B:
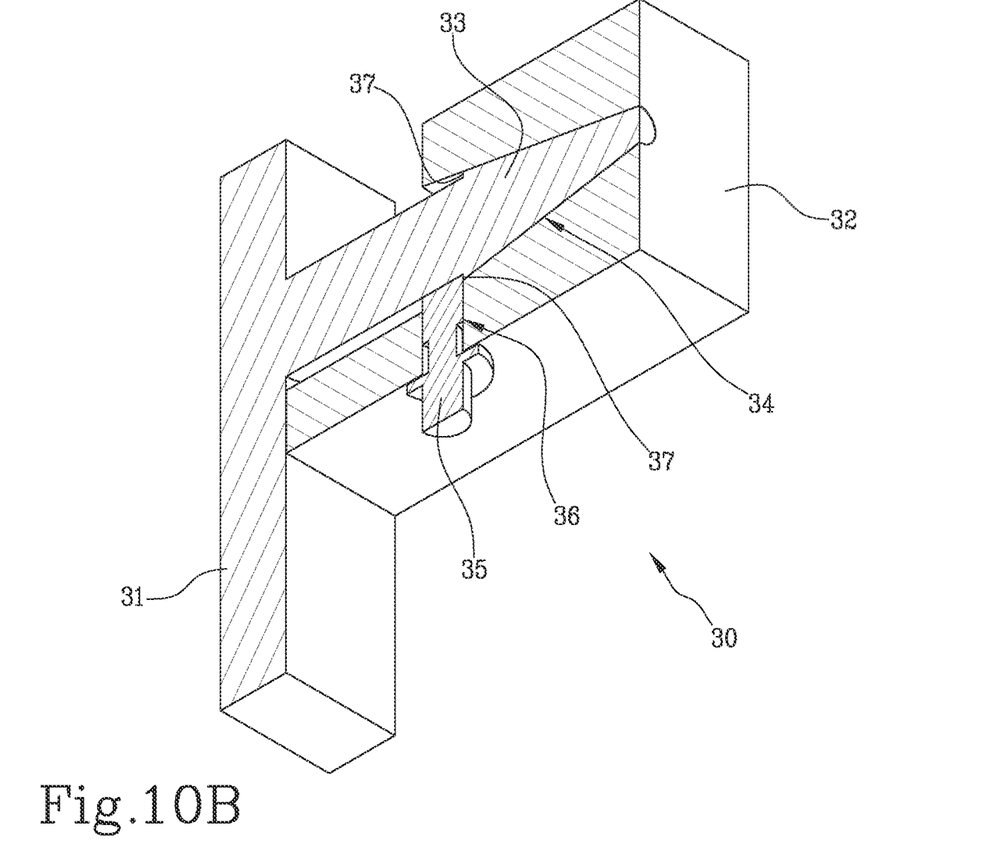

According to a preferred embodiment, illustrated in FIGS. 10A and 10B, the coupling means comprise a locking element 35.

The second means 32 comprise a cavity 36.

The locking element 35 is configured to be inserted in the cavity 36.

The protuberance 33 has at least one protrusion 37 and the locking element 35, when inserted in the cavity 36, is configured to make contact with the at least one protrusion 37.

In other words, the locking element 35 prevents the protuberance 33 from coming out of the recess 34.

According to another embodiment, the first means 31 are magnets which can be removably coupled directly to the base frame 49.

For example, the base frame 49 is made of a ferromagnetic material.

According to an aspect of the invention, the apparatus 1 comprises a manual lever designed to couple or uncouple the support device 10 and the base frame 49 using the coupling means 30.

According to an aspect, the manual lever is also designed to operate the parking brakes 18.

In other words, by actuating the manual lever, it is possible simultaneously couple and lock the support device 10 to the base frame 49 and activate the parking brakes 18 to prevent movements of the apparatus 1.

According to an aspect of the invention, the coupling means 30 are configured to allow a removable coupling between the support device 10 for a patient and the machine 40.

For brevity of description and to prevent repetitions, the coupling is not described in detail.

It should be noted, however, that the coupling between the support device 10 and the machine 40 using the coupling means 30 maintains all the features, configurations and advantages described above for coupling between the support device 10 and the base frame 49.

The supporting frame 43 can be inclined, by means of a rotation about an axis of inclination A1, between a first operating position P3 and a second operating position P4.

According to a preferred embodiment, the axis of inclination A1 is parallel to the horizontal.

According to an embodiment, the axis of inclination A1 passes through a pivot about which the arm 51 is hinged.

By means of the arm 51, the mechanical connection occurs between the base frame 49 and the supporting frame 43.

The arm 51 is hinged to the base frame 49 and is configured to rotate about the axis of inclination A1.

The supporting frame 43 is connected to the arm 51 (supported by the arm 51) and rotates in an integral fashion about the axis of inclination A1.

The inclination of the frame 43 between the first operating position P3 and the second operating position P4 allows a diagnostic examination to be performed in the first operating position P3 or in the second operating position P4.

Figure 11:
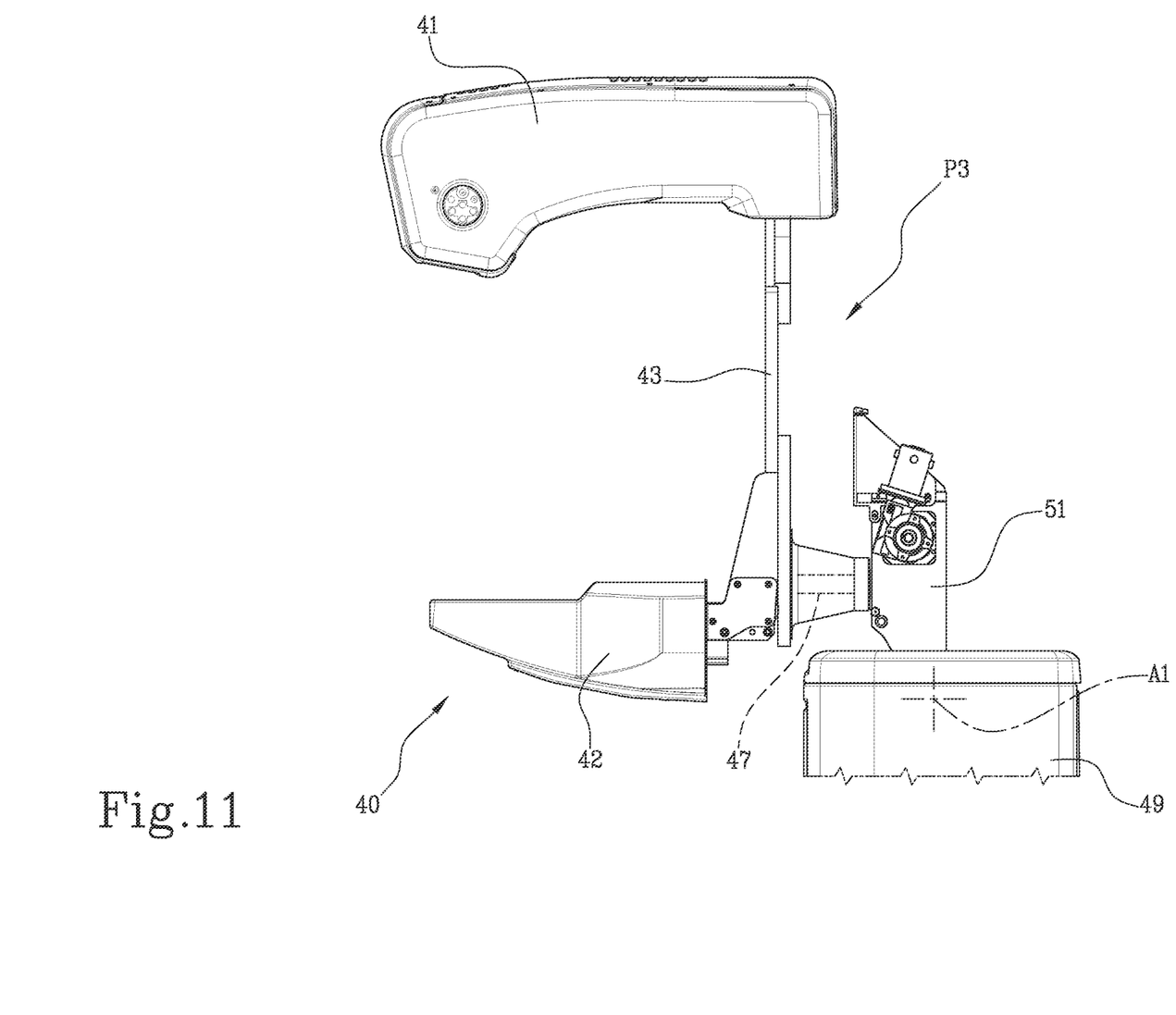
FIG. 11 schematically illustrates a detail of the apparatus of FIG. 1.

According to a preferred embodiment, illustrated in FIG. 11, the first operating position P3 corresponds to an arrangement of the supporting frame 43 in such a way as to perform a mammography with the patient standing up.

In other words, in the first operating position P3 the X-ray source 41 and the X-ray detector 42 are positioned, in use, parallel to the horizontal: one below and the other above, or vice versa, relative to the breast of the patient.

Advantageously, the possible inclination of the supporting frame 43 at different angles allows the apparatus 1 to be positioned in an optimum manner depending on the type of examination and/or the patient.

Preferably, the second operating position P4 of the supporting frame 43 is associated with the operating position P2 of the inclinable portion 11 of the support device 10.

Preferably, when the support device 10 and the machine 40 are coupled by the coupling means 30, the supporting frame 43 is inclined by rotation about the axis of inclination A1 by the same angle of inclination of the inclinable portion 11 relative to the horizontal.

Advantageously, the movement of the support device 10 and the machine 40—each depending on the movement of the other—allows X-ray analyses to be performed with different positions and geometries.

Advantageously, simultaneously inclining the support device 10 and the machine 40 allows the operators to manoeuvre the machine 40 in a more comfortable manner than a prior art apparatus operating at a single fixed inclination.

According to an aspect of the invention, the apparatus 1 comprises a second actuator 46.

The second actuator 46 is configured to incline the supporting frame 43 between the first operating position P3 and the second operating position P4.

The control unit U is configured to control the second actuator 46.

According to an aspect, the first control module U1 of the control unit U is configured to control the second actuator 46.

The first control module U1 is electrically coupled to the X-ray detector 42 to receive a signal relating to the X-rays detected by the X-ray detector 42.

The first control module U1 is configured to process said signal and derive an image.

The images derived may be, for example, two-dimensional or three-dimensional reconstructions of the breast.

According to an embodiment, the machine 40 comprises a breast compressor (not illustrated in the accompanying drawings).

The compressor is configured to compress the breast between the compressor itself and the X-ray detector 42 and is used, by way of a non-limiting example, during mammography.

Compression of the breast makes it possible to reconstruct higher quality images.

According to an aspect of the invention, the supporting frame 43 is configured to rotate about an axis of rotation A3.

Figure 1:
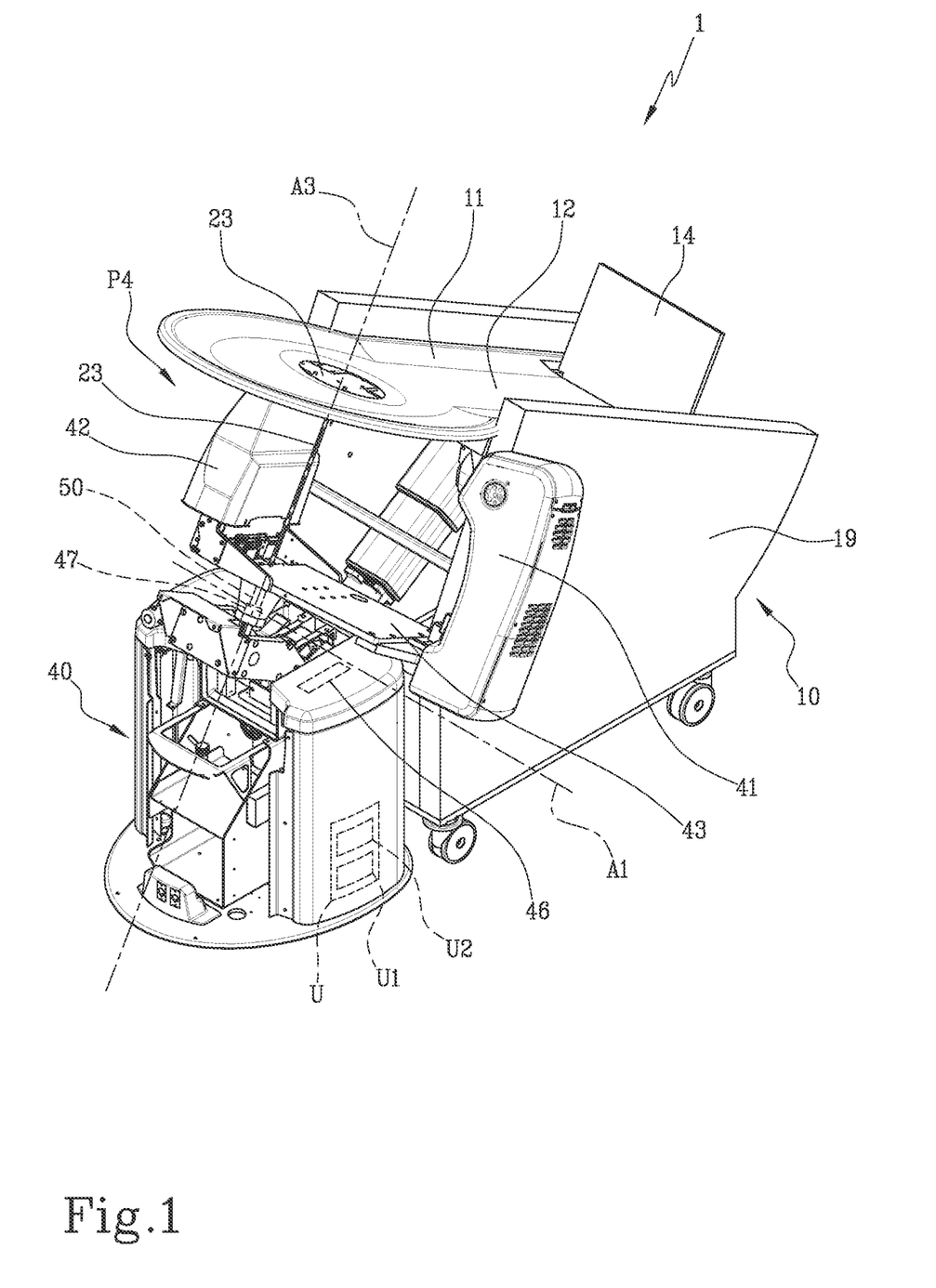
FIG. 1 is a schematic view of an embodiment of the apparatus according to the invention.
Figure 2:
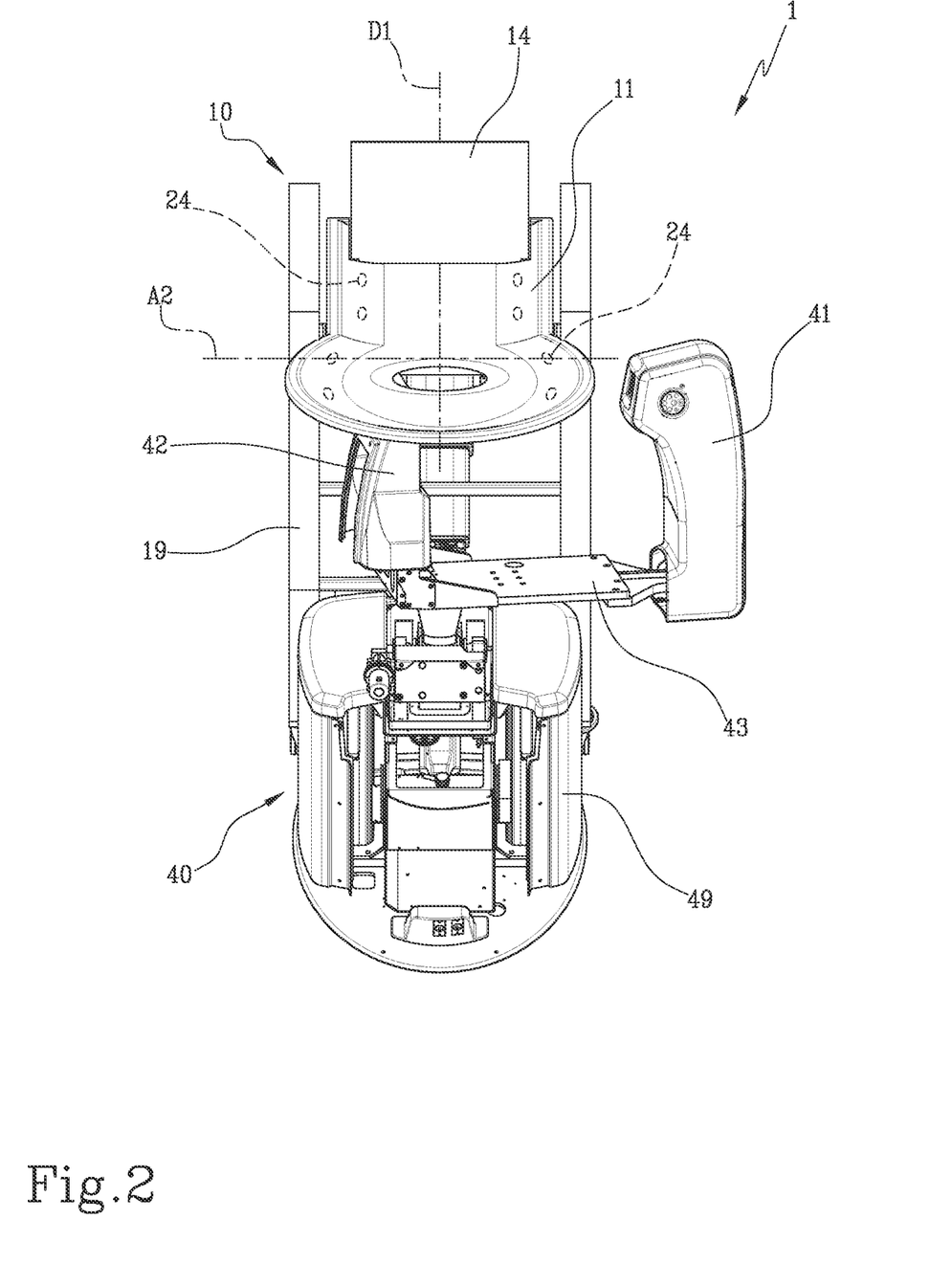
FIGS. 2 and 3 are schematic perspective views of the apparatus of FIG. 1.

According to a preferred embodiment, as illustrated in FIG. 1, the axis of rotation A3 is perpendicular to a direction parallel to the axis of inclination A1.

The supporting frame 43 can be inclined by rotating about the axis of inclination A1 and rotated about the axis of rotation A3.

It should be noted, for a more immediate understanding, that when the supporting frame 43 rotates about the axis of inclination A1, the axis of rotation A3 also rotates in an integral fashion, relative to the supporting frame 43, about the axis of inclination A1.

Advantageously, rotating the supporting frame 43 about the axis of rotation A3 makes it possible to perform examinations, such as, for example, the CBBCT, which require the rotation/oscillation of the X-ray source 41 as one with the X-ray detector 42.

According to an aspect of the invention, the axis of rotation A3 is situated on the supporting frame 43 at a distance from the X-ray detector 42 of between 10 mm and 300 mm, preferably between 10 mm and 200 mm, even more preferably between 10 mm and 100 mm.

Advantageously, the axis of rotation A3 located at a smaller distance from the detector 42 than the source 41 allows the detector 42 to be kept at an optimum distance from the breast for capturing images for each type of examination.

According to an aspect of the invention, the apparatus 1 comprises a third actuator 47.

The third actuator 47 is configured to rotate the supporting frame 43 with respect to the axis of rotation A3.

The control unit U is configured to control the third actuator 47.

According to an aspect, the first control module U1 is configured to control the third actuator 47.

According to an aspect of the invention, the supporting frame 43 comprises a first portion 43A and a second portion 43B.

The first portion 43A supports the X-ray detector 42.

The second portion 43B supports the X-ray source 41.

The second portion 43B is configured to rotate, relative to the first portion 43A, according to a further axis of rotation A4.

In other words, it is possible to rotate the X-ray source 41 relative to the X-ray detector 42.

According to an embodiment, the further axis of rotation A4 is parallel to the axis of rotation A3.

According to another embodiment, the further axis of rotation A4 coincides with the axis of rotation A3.

According to an aspect, the second portion 43B is configured to rotate between different positions corresponding to different angles of rotation about the further axis of rotation A4.

Advantageously, rotating the second portion 43B relative to the first portion 43A makes it possible to perform examinations, such as, for example, mammary tomosynthesis, which typically require rotation/oscillation of the X-ray source 41 while keeping the X-ray detector 42 stationary.

It should be noted that it is possible to combine the rotation of the supporting frame 43 about the axis of inclination A1 and the rotation of the second portion 43B relative to the further axis of rotation A4 maintaining the features and the related advantages described above.

According to an aspect of the invention, the apparatus 1 comprises a sixth actuator 50.

The sixth actuator 50 is configured to rotate the second portion 43B relative to the first portion 43A, according to the further axis of rotation A4.

The control unit U is configured to control the sixth actuator 50.

According to an aspect, the first control module U1 is configured to control the sixth actuator 50.

According to an aspect of the invention, the X-ray detector 42 is movable between a first position P7 away from the X-ray source 41 and a second position P8 towards the X-ray source 41 along a direction of movement D2.

The X-rays mainly develop in a beam.

The direction of movement D2 of the X-ray detector 42 is along a direction at right angles to the plane of receiving the X-rays of the detector 42 itself, joining the X-ray source 41 and the X-ray detector 42 itself.

According to an aspect, the supporting frame 43 comprises a flat surface 43C.

The direction of movement D2 does not intersect the flat surface 43C.

The direction of movement D2 is at right angles to the axis of rotation A3.

According to an embodiment, the X-ray detector 42 is configured to be positioned, along the direction of movement D2, in a third position P9, corresponding to any position between the first position P7 and the second position P8.

According to an aspect of the invention, the apparatus 1 comprises a fourth actuator 48.

The fourth actuator 48 is configured for moving the X-ray detector 42 between the first position P7 away from the X-ray source 41 and the second position P8 towards the X-ray source 41.

The control unit U is configured to control the fourth actuator 48.

According to an aspect, the first control module U1 is configured to control the fourth actuator 48.

Advantageously, the X-ray detector 42 which can be positioned in various positions between a first position P7 and a second position P8 makes it possible to optimise the position of the detector 42 according to the type of examination performed.

According to an aspect of the invention, the apparatus 1 comprises anti-collision sensors, not illustrated in the accompanying drawings.

The anti-collision sensors are positioned on the X-ray detector 42 and are connected to the control unit U.

The anti-collision sensors are configured to detect the contact between the detector 42 and any other element and to send a signal to the control unit U when the contact occurs.

The control unit U is configured to receive the signal and block each movement of the apparatus 1.

In other words, the control unit U, when it receives from the anti-collision sensors the signal of contact between the detector 42 and any other element, prevents the movement of each of the components of the apparatus 1.

Advantageously, blocking each movement of the apparatus 1 when the anti-collision sensors detect a contact makes it possible to avoid any unplanned impact or compression of the breast which may cause pain to the patient.

Advantageously, locking each movement of the apparatus 1 significantly increases the safety of the patient since it prevents any injury, even serious injuries.

It should be noted that the procedure for protection of the patient is particularly suitable for examinations such as CBBCT which requires rotation of the detector 42 around the breast.

Advantageously, this automated protection procedure makes it possible to keep the detector at a minimum distance from the breast, thus optimising the breast imaging system, while also maintaining the safeguard of not causing pain to the patient even against drawbacks.

According to an aspect, the anti-collision sensors are distance sensors configured to detect the distance between the detector 42 and any other element.

According to an aspect of the invention, the apparatus 1 comprises at least one calibration body 23.

The at least one calibration body 23 is removably coupled to the inclinable portion 11 of the support device 10.

Advantageously, the at least one calibration body 23 allows the support device 10 to be positioned in an optimum manner relative to the machine 40.

In particular, the at least one calibration body 23 allows the opening 13 to be correctly positioned relative to the axis of rotation A3.

According to an aspect of the invention, the graphical marking elements, described above, operatively act in conjunction with the at least one calibration body 23.

It should be noted that in the normal diagnostic procedures it is worthwhile periodically calibrating the positioning of the support device 10, and in particular of the opening 13 of the inclinable portion 11 relative to the machine 40.

In particular, this calibration is often required when the machine 40 is reactivated following a switching off.

The need for a calibration may also be necessary following a movement of the apparatus 1 or a part of it.

According to the invention, the control unit U comprises a user interface, not illustrated in the accompanying drawings.

Advantageously, the user interface allows the operator to display, set up and control the commands of the apparatus 1.

In particular, thanks to the user interface, the operator is able to control the movement of the support device 10 and of the machine 40 and of each of their components.

Advantageously, thanks to the user interface, the operator can thus be automatically informed of the values measured by the sensors of the lifting plane 14 and/or by the movement sensors 24 and/or by the anti-collision sensors.

The X-ray analyses which the apparatus 1 can perform may be, for example, without limiting the scope of the invention, Breast CT, Cone Beam Breast CT (CBBCT), mammography, mammary tomosynthesis, CESM.

For example, in order to perform a CBBCT, the source 41 must be able to rotate together with the detector 42 about the breast by a predetermined angle, preferably between 120° and 240°, even more preferably between 150° and 220°, even better between 180° and 210°.

In that way, the cone-shaped X-ray beam emitted by the source 41 and absorbed by the detector 42 makes it possible to reconstruct a three-dimensional image of the breast by scanning in a single rotation around the breast.

The patient is positioned prone on the support device 10.

The 3D reconstruction is performed using software in the control unit U, which also controls the movement of the elements of the apparatus 1 both during positioning of the patient and during analysis during the diagnostic examination.

The invention claimed is:

1. A medical apparatus for X-ray analysis, comprising:
    a control unit comprising at least a first control module;
    a support device for a patient;
    a machine for allowing a diagnosis, including:
        at least one X-ray source configured to emit X-rays,
        at least one X-ray detector configured to detect the X-rays,
        a supporting frame, supporting the at least one X-ray source and the at least one X-ray detector,
        a base frame supporting the supporting frame;
    the first control module being operatively connected to the machine and electrically coupled to the at least one X-ray detector to receive a signal relating to the X-rays detected by the at least one X-ray detector and configured to process said signal and derive an image;
    wherein the support device comprises an inclinable portion which is inclinable between a non-operating position and an operating position;
    wherein the supporting frame is inclinable, with respect to the base frame, by rotation about an axis of inclination, between a first operating position and a second operating position to allow a diagnostic examination to be performed in the first operating position or in the second operating position;
    a coupling removably connecting the support device and the base frame;
    wherein the supporting frame is configured to rotate about an axis of rotation perpendicular to a direction parallel to the axis of inclination;
    wherein the axis of rotation is situated on the supporting frame at a distance of between 10 mm and 300 mm from the at least one X-ray detector.

2. The medical apparatus according to claim 1, wherein the inclinable portion of the support device comprises a supporting surface for the patient.

3. The medical apparatus according to claim 2, wherein the supporting surface has an opening configured to receive at least one breast of the patient.

4. The medical apparatus according to claim 1, wherein the inclinable portion of the support device comprises a lifting plane.

5. The medical apparatus according to claim 4, wherein the lifting plane is movable along a main direction of extension of the inclinable portion and wherein said control unit is configured to control a movement of the lifting plane.

6. The medical apparatus according to claim 2, wherein the support device comprises at least one lateral support.

7. The medical apparatus according to claim 3, wherein the support device comprises a breast protection support, said breast protection support being located below, in use, the inclinable portion at the opening and being removable with respect to the inclinable portion.

8. The medical apparatus according to claim 7, wherein the breast protection support includes graphical marking elements.

9. The medical apparatus according to claim 7, and further comprising a radio frequency identification element operatively positioned with respect to said breast protection support.

10. The medical apparatus according to claim 1, wherein the support device comprises parking brakes.

11. The medical apparatus according to claim 1, wherein the support device comprises a base portion and the base portion of the support device comprises a plurality of wheels.

12. The medical apparatus according to claim 5, and further comprising a first actuator configured to move the inclinable portion, with respect to the base portion, in rotation with respect to an axis transversal to a main direction of extension of the inclinable portion and wherein said control unit is configured to control the first actuator.

13. The medical apparatus according to claim 1, wherein the support device comprises a locking element configured for engaging and locking the inclinable portion in a predetermined position between the non-operating position and the operating position.

14. The medical apparatus according to claim 12, wherein the control unit comprises a second control module configured to control the movement of the lifting plane and/or the first actuator.

15. The medical apparatus according to claim 1, and further comprising at least one calibration body removably coupled to the inclinable portion of the support device.

16. The medical apparatus according to claim 1, wherein the coupling comprises a first surface and a second surface removably acting in conjunction with the first surface and wherein the first surface is connected with one of either the support device or the machine and the second surface is connected with the other of either the machine or the support device.

17. The medical apparatus according to claim 1, wherein the supporting frame comprises a first portion, supporting the at least one X-ray detector, and a second portion, supporting the at least one X-ray source, and wherein the second portion is configured to rotate, with respect to the first portion, according to a further axis of rotation, said further axis of rotation being parallel to, or coinciding with, the axis of rotation.

18. The medical apparatus according to claim 1, and further comprising movement sensors of the support device and/or of the patient, connected to the control unit and configured to send a movement signal to the control unit, said control unit being configured to derive images as a function of said movement signal.

19. The medical apparatus according to claim 1, wherein the at least one X-ray detector is movable between a first position away from the at least one X-ray source and a second position towards the at least one X-ray source.

20. The medical apparatus according to claim 12, and further comprising a second actuator configured to incline the supporting frame between the first operating position and the second operating position, and wherein said control unit is configured to control the second actuator.

21. The medical apparatus according to claim 20, and further comprising a third actuator configured to rotate the supporting frame with respect to the axis of rotation and wherein said control unit is configured to control the third actuator.

22. The medical apparatus according to claim 19, and further comprising a fourth actuator configured for moving the at least one X-ray detector between the first position away from the at least one X-ray source and the second position towards the at least one X-ray source.

23. The medical apparatus according to claim 1, wherein the inclinable portion is rotatable with respect to the base portion about an axis of rotation transversal to a main direction of extension of the inclinable portion and wherein the axis of rotation of the inclinable portion is spaced apart from the axis of inclination of the supporting frame.

24. The medical apparatus according to claim 1, wherein the axis of rotation of the inclinable portion is positioned below and forward of the axis of inclination of the supporting frame.

* * * * *